United States Patent
Shaw, II et al.

(10) Patent No.: US 12,314,405 B2
(45) Date of Patent: *May 27, 2025

(54) MANAGING THE LOADING OF SENSITIVE MODULES

(71) Applicant: Open Text Inc., Menlo Park, CA (US)

(72) Inventors: John R. Shaw, II, Broomfield, CO (US); Andrew L. Sandoval, San Antonio, TX (US)

(73) Assignee: Open Text Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,098

(22) Filed: Mar. 18, 2024

(65) Prior Publication Data

US 2024/0220637 A1    Jul. 4, 2024

Related U.S. Application Data (63) Continuation of application No. 17/993,068, filed on Nov. 23, 2022, now Pat. No. 11,966,478, which is a continuation of application No. 17/220,773, filed on Apr. 1, 2021, now Pat. No. 11,550,926, which is a continuation of application No. 16/143,797, filed on Sep. 27, 2018, now Pat. No. 11,030,320.

(60) Provisional application No. 62/657,365, filed on Apr. 13, 2018.

(51) Int. Cl.
    *G06F 21/57*    (2013.01)
    *G06F 21/51*    (2013.01)
    *G06F 21/55*    (2013.01)
    *G06F 21/60*    (2013.01)

(52) U.S. Cl.
     CPC ............ *G06F 21/577* (2013.01); *G06F 21/51* (2013.01); *G06F 21/552* (2013.01); *G06F 21/604* (2013.01)

(58) Field of Classification Search
     CPC ...... G06F 21/577; G06F 21/51; G06F 21/552; G06F 21/604
     See application file for complete search history.

(56) References Cited

U.S. PATENT DOCUMENTS

| | | | |
|---|---|---|---|
| 2013/0097660 A1* | 4/2013 | Das | H04L 63/205 726/1 |
| 2015/0161390 A1* | 6/2015 | Xuan | G06F 21/57 726/22 |
| 2015/0295901 A1* | 10/2015 | Woodward | H04L 63/0492 713/168 |

* cited by examiner

*Primary Examiner* — Ayoub Alata
(74) *Attorney, Agent, or Firm* — Sprinkle IP Law Group (57) ABSTRACT

The present disclosure relates to systems and methods for identifying highly sensitive modules and taking a remediation or preventative action if such modules are accessed by malicious software. For example, the likelihood that a module is used for an exploit, and is thus sensitive, is categorized as high, medium, or low. The likelihood that a module can be used for an exploit can dictate whether, and to what degree, an application accessing the module is "suspicious." However, in some instances, a sensitive module may have legitimate reasons to load when used in certain non-malicious ways. The system may also consider a trust level when determining what actions to take, such that an application and/or user having a higher trust level may be less suspicious when accessing a sensitive module as compared to an application or user having a lower trust level.

20 Claims, 5 Drawing Sheets

MANAGING THE LOADING OF SENSITIVE MODULES

CROSS-REFERENCE TO RELATED APPLICATIONS

This application is a continuation of, and claims a benefit of priority under 35 U.S.C. 120 of, U.S. application Ser. No. 17/993,068, filed Nov. 23, 2022, issued as U.S. Pat. No. 11,966,478, entitled "MANAGING THE LOADING OF SENSITIVE MODULES," which is a continuation of, and claims a benefit of priority under 35 U.S.C. 120 of, U.S. application Ser. No. 17/220,773, filed Apr. 1, 2021, issued as U.S. Pat. No. 11,550,926, entitled "MANAGING THE LOADING OF SENSITIVE MODULES," which is a continuation of, and claims a benefit of priority under 35 U.S.C. 120 of, U.S. application Ser. No. 16/143,797 filed Sep. 27, 2018, issued as U.S. Pat. No. 11,030,320, entitled "MANAGING THE LOADING OF SENSITIVE MODULES," which claims a benefit of priority under 35 U.S.C. 119 (e) to U.S. Provisional Application No. 62/657,365 filed Apr. 13, 2018, entitled "MANAGING THE LOADING OF SUSPICIOUS MODULES," all of which are hereby incorporated herein for all purposes.

BACKGROUND

An exploit is a piece of code, software, data, or a sequence of commands that takes advantage of a bug, glitch, or vulnerability in order to cause unintended or unanticipated behavior to occur on computer software, hardware, or any other electronic component. Exploits are usually intended for malicious purposes and pose threats that can compromise a computing system or device, for example, by hijacking normal execution of a process and directing the code flow towards a zone of memory where exploit code resides. For instance, exploit code may launch a new process or manipulate an existing process to perform a malicious exploit. Prevention of software exploits from executing code is a paramount security concern for system users and administrators.

Exploits may take advantage of highly sensitive modules, such as modules that provide the kernel and executive layers of the operating systems kernel space. Such modules may be responsible for various system services such as hardware virtualization, process, and memory management. One particular example would be an executable file that is most often associated with instantiating the operating system during boot-up. While the use of these highly sensitive modules may be necessary to enable execution of the operating system, the use of these modules by other processes tends to be extremely dubious. For example, malicious applications may attempt to map or load such components of the operating system into a user-mode process for the purpose of identifying sensitive kernel information using such highly sensitive modules.

One approach to stop such malicious applications is to identify applications that use the highly suspicious module and prevent the module from running outside of operating system use. Non-malicious applications, however, may have legitimate reasons to load, execute, or otherwise access the highly sensitive module, and the universe of non-malicious applications that have legitimate reasons to run the highly sensitive module may not be known. Accordingly, preventing such non-malicious applications from running may negatively impact the user experience.

It is with respect to these and other general considerations that aspects of the technology have been made. Also, although relatively specific problems may be discussed, it should be understood that the examples should not be limited to solving the specific problems identified in the background or elsewhere in this disclosure.

SUMMARY

The present disclosure relates to systems and methods for identifying highly sensitive modules and taking a remediation or preventative action if such modules are accessed by malicious software. For example, an application or module or other code ("module") may be scanned during or prior to load to identify attributes of the module. These module attributes may be compared to a database to determine whether the module is "sensitive," such that it has been identified as one that is likely used for an exploit. In some aspects, the likelihood that a module is used for an exploit, and is thus sensitive, is categorized as high, medium, or low. The likelihood that a module can be used for an exploit can dictate whether, and to what degree, an application accessing the module is "suspicious." In some instances, a sensitive module may have legitimate reasons to load when used in certain non-malicious ways. However, an application accessing a sensitive module is at least "suspicious," such that one or more computing systems may take an action, such as preventing the module from loading, querying a user, or monitoring the application accessing the module so as to prevent the sensitive module from being used in a manner that is malicious.

The system may also consider a trust level when determining what actions to take. For example, users and/or applications may be categorized into trust levels based on various attributes, including, but not limited to, an associated privilege level, a digital signature, and/or a certificate authority, among other attributes. For example, users with a high trust level may be queried when a highly sensitive module is accessed, whereas an application accessing a highly sensitive module under a user account with a low trust level may result in module access being denied or prevented. Similarly, an application that has a high trust level may be permitted to access a highly sensitive module or, in some examples, may be permitted access conditional upon user approval. In other examples, an application having a low trust level may be automatically denied access to the highly sensitive module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for identifying suspicious access (e.g., executing, loading, etc.) of sensitive modules and taking a remediation action. In aspects, a computing system is operatively configured to perform the steps of (or have access to components that are operatively configured to perform the steps of) identifying the attributes of a module to characterize the module as sensitive, assessing the trust level (e.g., of a user or an application) associated with the attempted module access, and determining whether an application accessing the module is suspicious. The computing system may then take a designated action based on the determination of whether the application is suspicious and, in some instances, how suspicious the application is. These actions include, for example, preventing the module from taking the action, querying a user to determine whether to perform the action, capturing information related to the action/module, and/or allowing the application to access the module. Capturing information related to the action, application, and/or module may allow the dissemination of information across multiple computing systems.

Accordingly, the present disclosure provides a plurality of technical benefits including but not limited to: reduction in falsely identifying an application accessing a module as malicious where the module is executed in an environment (e.g., relating to an application accessing the module, a user account associated with executing the application, etc.) having a high indicia of trust; falsely identifying an application accessing a module as benign where the module is executed in an environment having a low indicia of trust; efficiently categorizing potentially suspicious module access to reduce the amount of feedback requested from a user, and efficiently disseminating information regarding trusted/malicious applications and/or highly sensitive modules.

Figure 1:
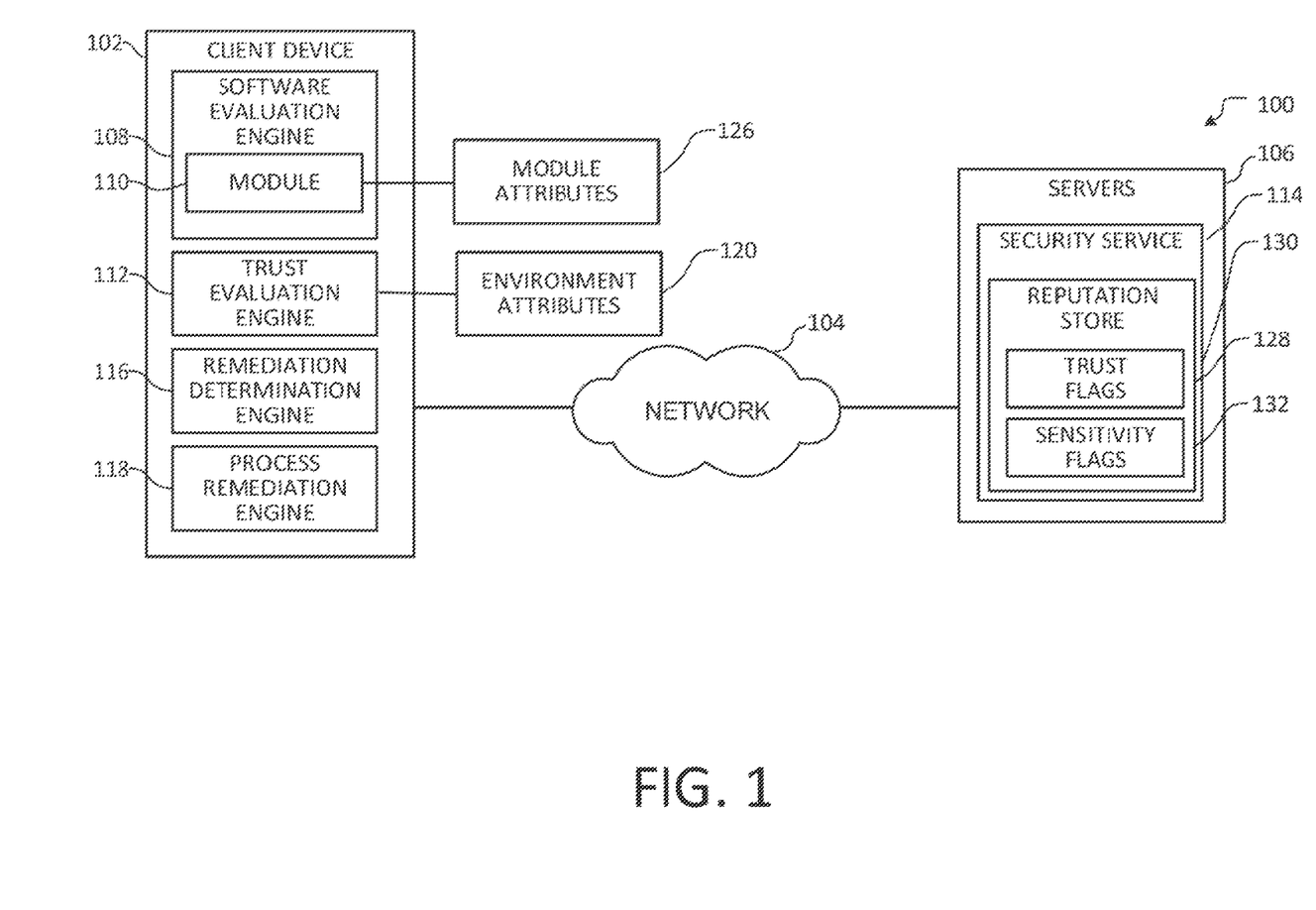
FIG. 1 illustrates an example system in which aspects of managing the loading of suspicious modules may be implemented.

FIG. 1 illustrates an example system 100 in which aspects of the managing the loading of sensitive modules may be implemented. Example environment 100 is presented as a combination of interdependent components that interact to form an integrated whole for assessing module sensitivity levels, assessing trust levels, assessing module and/or application activity, and taking action based on the assessed module sensitivity level and trust level, as well as the module and/or application activity. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 2. In other examples, the components of systems disclosed herein may be spread across multiple devices. For instance, input may be entered or detected on a client device and information may be processed or accessed from other devices in a network, such as one or more server devices.

As one example, the system 100 comprises client device 102, distributed network 104, and distributed server environment comprising one or more servers 106 ("servers"). One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client device 102 may comprise software evaluation engine 108. The software evaluation engine 108 may evaluate a module to determine a sensitivity level of the module 110. For example, the module 110 may be deemed to have a low sensitivity level, a medium sensitivity level, or a high sensitivity level.

According to aspects described herein, the software evaluation engine 108 may use module attributes 126 of the module 110 to determine whether an application accessing the module 110 is suspicious. In examples, one method that the software evaluation engine 108 may employ to discover module attributes 126 is to perform a scan of the software module 110 during load, install, or download of the one or more files associated with the module 110. Such a scan may reveal module attributes 126 including, but not limited to, author, file name(s), file extension(s), etc. The module attributes 126 may also include digital certificate information, catalog information, or other information related to the module 110 and/or the source of the module 110, etc. The software evaluation engine 108 may use the module attributes 126 to determine whether the module should be categorized as highly sensitive, among other sensitivity levels.

In aspects of the technology, the software evaluation engine 108 performs a scan on one or more files associated with the modules 110 to identify particular information and add it to the module attributes 126. For example, the header data of a file may be analyzed to determine the schema and/or file type of a file associated with a module 110 being analyzed by a software evaluation engine 108. Parsing may further extract static data from one or more files during the parsing process. The static data may include data such as header information, section information, import and export information, certificate information, resource information, string and flag information, legal information, comments, and program information, among other examples. From this information, the software evaluation engine 108 may identify various module attributes 126 of the module 110.

As illustrated, sensitivity flags 132 may be stored by the servers 106 and may be part of the security service 114. Sensitivity flags 132 may be used to generate a sensitivity level for a given module. For instance, the module attributes 126 may be evaluated based on sensitivity flags 132 to flag the module 110 as not sensitive, somewhat sensitive, and highly sensitive. It will be appreciated that other categorization systems are contemplated by the present disclosure.

Sensitivity flags 132 may be set generally based on general attributes. For example, these attributes may include whether the modules are associated with system-level functionality, the type of module (e.g., network module, driver module, etc.), and/or the ways in which the module is typically utilized. In some examples, an administrator may specify one or more sensitivity flags that identify particular modules and/or module attributes as not sensitive, somewhat sensitive, and/or highly sensitive. For example, a system administrator may believe that a particular module is very safe (e.g., the module does not access system processes). In such instances, the system administrator may categorize the module as low or not sensitive, such that the categorization may be reflected accordingly in sensitivity flags 132. On the other hand, an administrator may believe that a particular module has a high potential for abuse. In such a situation, the administrator may set a relevant sensitivity flag 132 to highly sensitive for the particular module. For example, this may occur when a module is associated with the manipulation of system services such as hardware virtualization, process and memory management. It will be further appreciated that setting of such sensitivity flags (e.g., categorizing modules and/or module attributes, etc.) may be automated based on rules. Sensitivity flag rules may be based on a variety of characteristics such as: whether the module is digitally signed by a trusted certificate and/or a certificate issued by a trusted certificate authority, whether the module is listed in a security catalog, whether the module has been whitelisted (e.g., by a user, by a system administrator, by an automated process, etc.), and/or an analysis of reputation information of the provider of the module.

Additionally or alternatively, a sensitivity level of a module (or, in some instances, sensitivity flags 132) may be set or altered by responses to user queries. For example, a module may have been initially identified as somewhat sensitive, and this identification may have occurred as a result of sensitivity flags 132. In such an instance, the categorization of the module may be automatically changed from somewhat sensitive to highly sensitive where a predetermined number of users indicate (via query, for example) that they do not want the module to be loaded in a particular manner or by a particular user.

In aspects of the technology, by comparing the sensitivity flags 132 to the module attributes 126, the software evaluation engine 108 may assign a sensitivity level to the module 110. For example, certain module attributes 126 may be categorized as highly sensitive by the threat flags 132. Accordingly, the software evaluation engine 108 would assign a sensitivity level of highly sensitive. Alternatively, the module attributes 126 may be categorized as a medium or somewhat sensitive by threat flags 132. Accordingly, the software evaluation engine 108 would assign a sensitivity level of somewhat sensitive.

While illustrated as being stored by servers 106, sensitivity flags 132 need not be, and may rather be stored on individual clients, such as client 102. One potential advantage of having the sensitivity flags 132 housed on one or more servers is the server 106 can dynamically change the information in the sensitivity flags 132 push (or otherwise expose) those changes to client devices, such as client device 102. This enables relatively fast dissemination of information related to a potential exploit is discovered.

Software evaluation engine 108 may receive or obtain sensitivity flags 132 from the security service 114 via the network 104. In aspects of the technology, the software evaluation engine 108 determines a sensitivity level for module 110 using a variety of means. In aspects of the technology, the software evaluation engine may compare the module attributes 126 of the module 110 to the sensitivity flags 132. That is, for example, the security service 114 may provide information to the software evaluation engine 108 so as to enable the software evaluation engine 108 to assign a sensitivity level to a particular module, such as module 110, by comparing the identified module attributes 126 to determine whether the security characteristics are the same as or similar to one that has been flagged as non-sensitive, somewhat sensitive, or highly sensitive as categorized by sensitivity flags 132.

As illustrated, system 100 also includes trust evaluation engine 112. In aspects of the technology, the trust evaluation engine 112 may identify environment attributes 120. In examples, environment attributes 120 may relate to the user's ability to perform certain tasks or access certain programs (e.g., permissions or privileges). These may include the right to install programs, the right to execute programs, the right to execute programs that perform certain functions, etc. These attributes may be tied to the user account or profile. For example, a user may login into the client device 102 which will associate the computer user account having certain privileges, which privileges comprise the user module 120. In another example, environment attributes 120 may relate to attributes associated with one or more applications, such as an application that attempts to access the module 110. For instance, environment attributes 120 may comprise information relating to a digital signature of an application, a certificate authority associated with the application, a website or storage medium from which the application was accessed, etc. While example environment attributes are described herein, it will be appreciated that any of a variety of attributes may be evaluated to generate a trust level according to aspects described herein.

The security service 114 may also include trust flags. These trust flags 128 may associate a general user's privilege level, application attributes, and/or other environment attributes with a trust level. For example, a user having administrative privileges may be designated as having a high level of trust, whereas a user operating the client device in guest mode may be designated as a low level of trust. Similarly, an application signed by a trusted certificate authority may have a high level of trust, whereas an unsigned application may have a low level of trust.

The security service 114 may expose the trust evaluation engine 112 to the trust flags 128 such that the trust evaluation engine 112 can compare the environment attributes 120 with the trust flags 128 to determine a trust level. Such exposure may occur based on a time threshold (e.g., must update every 12 hours) or based on an activity threshold (e.g., must update anytime an application and/or user attempts to access a module, etc.). Accordingly, a trust level may be used to evaluate a sensitivity level of a module when evaluating whether an application accessing the module is suspicious according to aspects described herein.

The sensitivity level of the module 110 as may be determined by a software evaluation engine (such as software evaluation engine 108) and the trust level of the computing environment (e.g., based on a user account, an application accessing the module, etc.) as may be determined by a user evaluation engine (such as user evaluation engine 112) are evaluated by a remediation determination engine (such as remediation determination engine 116) to determine whether an application is suspicious. In an example, remediation determination engine 116 evaluates an application when the application accesses a module (e.g. module 110). In some examples, trust evaluation engine 112 generates a trust level contemporaneously with the determination while, in other examples, the trust level may be previously generated. In an example, the determination may comprise determining the degree to which the application is suspicious. For example, an application accessing a module having low sensitivity may not be as suspicious as an application accessing a module having high sensitivity. When it is determined that the application is suspicious, the remediation determination engine 116 determines what action to take on the basis of the sensitivity level of the module and the generated trust level. For example, a suspicion level of high combined with a trust level of low may be treated differently than a suspicion level of high combined with a trust level of high. Table 1 is provided as an example matrix of how the remediation determination engine 116 may determine an action to take based on the trust level/sensitivity level analysis.

TABLE 1

| | | Sensitivity Level | | |
| --- | --- | --- | --- | --- |
| | | Low | Medium | High |
| Trust Level | Low | Monitor Behavior | Request User Verification | Prevent Action |
| | Med | Take No Action | Monitor Behavior | Request User Verification |
| | High | Take No Action | Take No Action | Monitor Behavior |

As may be appreciated, the columns of Table 1 indicate the sensitivity level of a module and are labeled Low, Medium, and High. Additionally, the rows of Table 1 indicate the trust level of aspects of the computing environment (e.g., a user, an application, etc.) and are labeled Low, Medium, and High. Thus, the top-right most indicates a high sensitivity level and a low trust level. In such a situation, the system may prevent the module from being accessed by the application. Further, as indicated by Table 1, where the trust level is medium and the module is of a medium sensitivity level, the system may monitor the behavior of the application accessing the module. Also, where the trust level is high but the sensitivity level is low, the system may take no action, thereby permitting the application to access the module.

The determined action may be carried out be process remediation engine 118. For example, the remediation determination engine 116 may pass information related to what action to take to the process remediation engine 118. In instances where the information indicates that there is no action to take, the process remediation engine 118 will take no action. In instances where the behavior is meant to be monitored, the process remediation engine 118 will monitor the behavior and may report information related to the application and/or use of the module to the security service 114. Where the information passed indicates that user verification is required, the process remediation engine 118 may prompt a user to confirm that they intend for the application to proceed. Where the information passed indicates that the module action/load is to be prevented, the process remediation engine 118 prevents the application from accessing the module.

Figure 2:
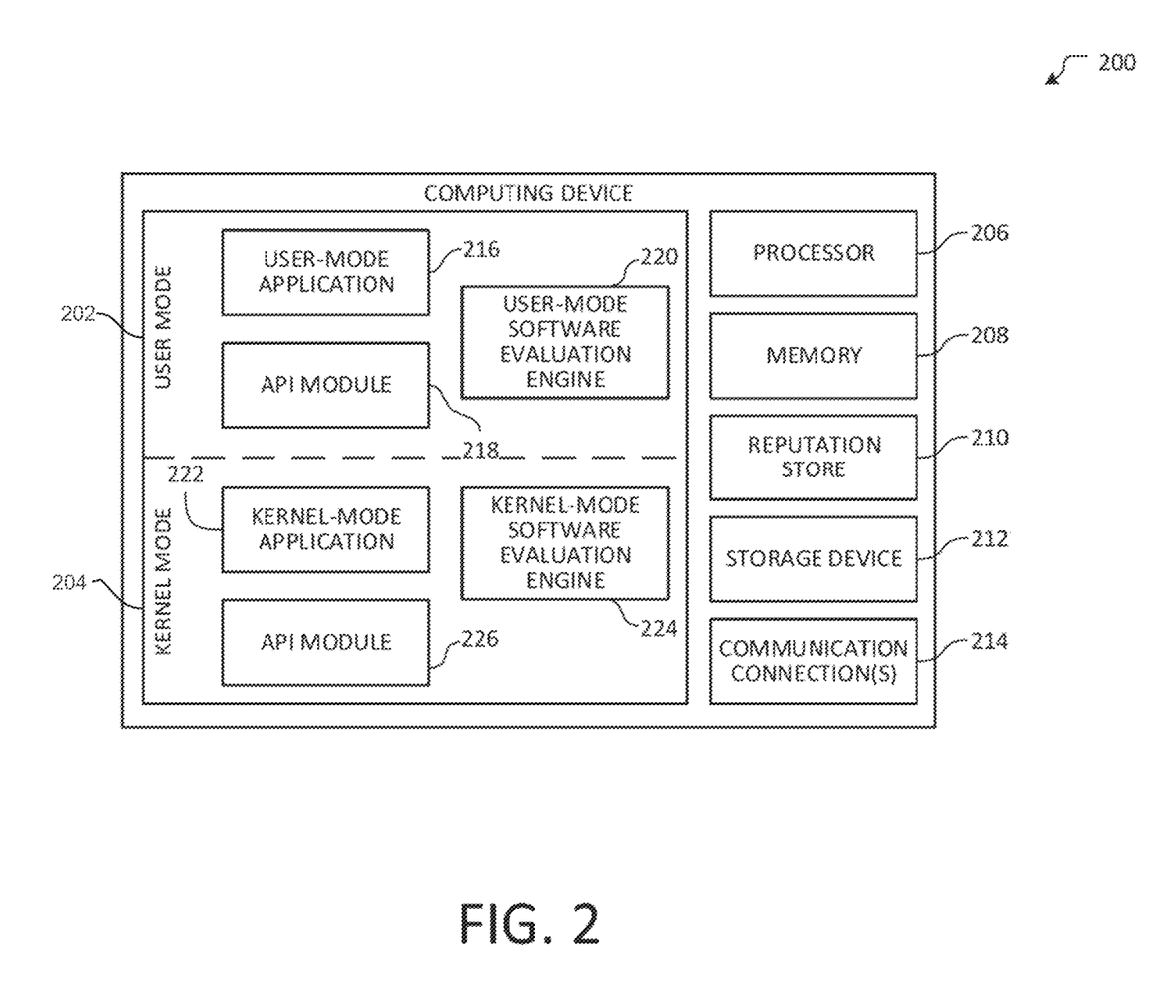
FIG. 2 illustrates an exemplary system unit for implementing the anti-exploit system described herein.

FIG. 2 illustrates an overview of an example computing device 200 with which aspects of the present innovative technologies may be performed. In an example, computing device 200 may be any of a variety of devices, including, but not limited to, a mobile computing device, a tablet computing device, a desktop or laptop computing device, an Internet of Things (IoT) computing device, a server computing device, or a distributed computing device. In some examples, computing device 200 may form at least a part of an execution environment in which an OS (e.g., which may comprise kernel module 222) and/or other software (e.g., application 216) may execute.

As illustrated, computing device 200 is comprised of user mode 202, kernel mode 204, processor 206, memory 208, security service 210, storage device 212, and communication connections(s) 214. In some examples, processor 206, memory 208, storage device 212, and communication connection(s) 214 may be usable by software executed by computing device 200. In some examples, one or more APIs modules (e.g., API module 218 and/or API module 226) may be useable by software executed by computing device 200 (e.g., user mode application 216 and/or kernel mode application 222) to access, interface with, and/or control aspects of computing device 200 (e.g., thread creation or deletion at processor 206, memory allocation or manipulation at memory 208, file search or access at storage device 212, network communication via communication connection(s) 214, etc.).

Computing device 200 is illustrated as comprising user mode 202 and kernel mode 204. In examples, certain system-level functionality (e.g., which may be accessible via API module 226) may be restricted to software (e.g., kernel-mode application 222) operating in kernel mode 204, while other software (e.g., user-mode application 216) may instead have access to functionality available in user mode 202 (e.g., via API module 218). Such a division between user mode 202 and kernel mode 204 may provide various security benefits (e.g., decreased exploitability of software bugs, improved handling of user permissions, etc.) and may ensure system-level functionality is not easily accessed by a set of software instructions. While an example separation between user mode 202 and kernel mode 204 is described herein, it will be appreciated that other separations may be used (e.g., additional, alternative, or fewer, etc.) without departing from the spirit of this disclosure.

User-mode application 216 and kernel-mode application 222 are provided as example software that may be executed by computing device 200. As described above, similar aspects disclosed herein may be applied to other sets of software instructions. As illustrated, user-mode application 216 may attempt to execute, load, or otherwise access API module 218 of the system 200. As a result of the attempt to access API module 218, the user-mode software evaluation engine 220 may evaluate a sensitivity level of API module 218 and/or a trust level (e.g., as may be generated based on user-mode application 216, a user of computing device 200, etc.) to determine whether user-mode application 216 is suspicious, such that user-mode application 216 may be prevented from accessing API module 218 or may require user confirmation prior to such access, among other examples. In some instances, the system 200 may allow user-mode application 216 to access API module 218, but the system 200 will monitor the application during execution.

When user-mode software evaluation engine 220 receives an indication that user-mode application 216 has called or otherwise accessed API module 218, user-mode software evaluation engine 220 may receive execution control, such that user-mode software evaluation engine 220 may perform any of a variety of operations before execution returns to API module 218 and/or user-mode application 216. While example operations are described herein as occurring prior to continued execution, it will be appreciated that at least some of the operations may alternatively or additionally be performed substantially contemporaneously with continued execution and/or after execution of API module 218, among other examples. In some examples, user-mode software evaluation engine 220 may subsequently call kernel-mode software evaluation engine 224, such that at least a part of the operations and/or evaluations disclosed herein may be performed in kernel mode 204. In some examples, kernel-mode software evaluation engine 224 may be used in order to provide increased security or to perform processing using resources that may be otherwise unavailable from user mode 202, among other reasons.

In another example, kernel-mode software evaluation engine 224 may receive an indication that kernel-mode application 222 has called or otherwise accessed API module 226, such that kernel-mode action evaluation engine 224 may receive execution control. Accordingly, kernel-mode action evaluation engine 224 may perform any of a variety of operations before execution returns to API module 226 and/or kernel-mode application 222. While example operations are described herein as occurring prior to continued execution, it will be appreciated that at least some of the operations may alternatively or additionally be performed substantially contemporaneously with continued execution and/or after execution of API module 226, among other examples. In some examples, kernel-mode software evaluation engine 224 may subsequently call user-mode threat processor 220, such that at least a part of the operations and/or evaluations disclosed herein may be performed in user mode 202. In some examples, user mode software evaluation engine 220 may be used because user-mode software evaluation engine 220 may be more easily updated or maintained as a result of the reduced security restrictions that may be afforded by user mode 202.

As described above, user-mode software evaluation engine 220 and/or kernel-mode software evaluation engine 224 may evaluate user-mode application 216 and/or kernel-mode application 222 when API module 218 and/or 226 is called or otherwise accessed. In some examples, user-mode software evaluation engine 220 and/or kernel-mode software evaluation engine 224 may access reputation store 210 to access module attributes and/or environment attributes as described herein. While reputation store 210 is illustrated as being separate from storage device 212, it will be appreciated that reputation store 210 may be stored by storage device 212 in an example. In some examples, reputation store 210 may comprise a database of sensitivity flags and trust flags, one or more whitelists and/or blacklists, or other information as described above. In other examples, at least a part of the data stored by reputation store 210 may be cached from a security service that is remote from computing device 200, such as security service 114 described with reference to FIG. 1. Accordingly, the information from reputation store 210 may be used when determining whether an application (e.g., user-mode application 216 and/or kernel-mode application 222) is suspicious and, in some instances, how suspicious the application is. While example data structures, storage techniques, and reputation information is described herein, it will be appreciated that other examples may be used without departing from the spirit of this disclosure.

Figure 3A:
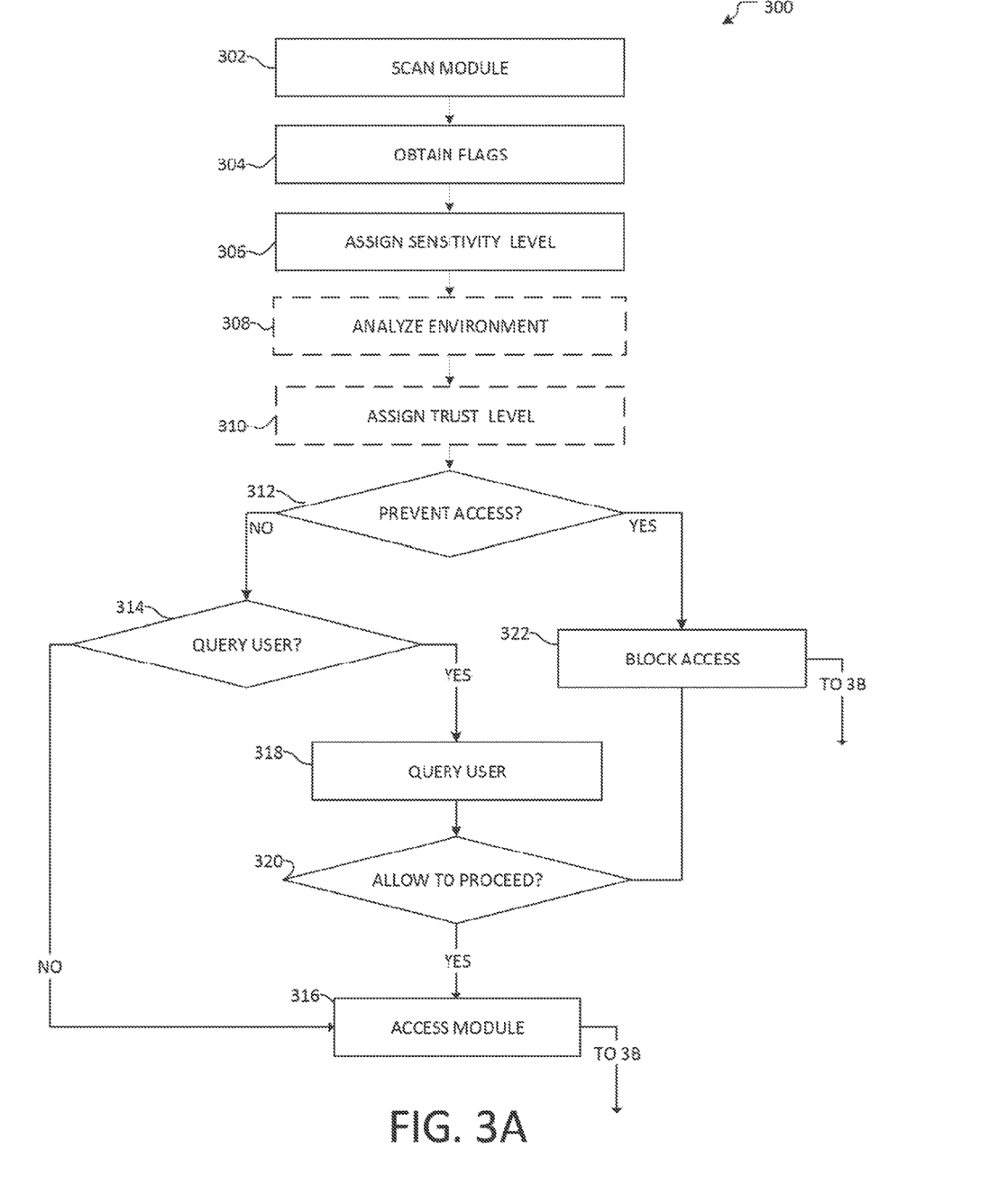
FIGS. 3A and 3B provide an example method for determining an action based on a module suspicion level and, optionally, a user trust level.
Figure 3B:
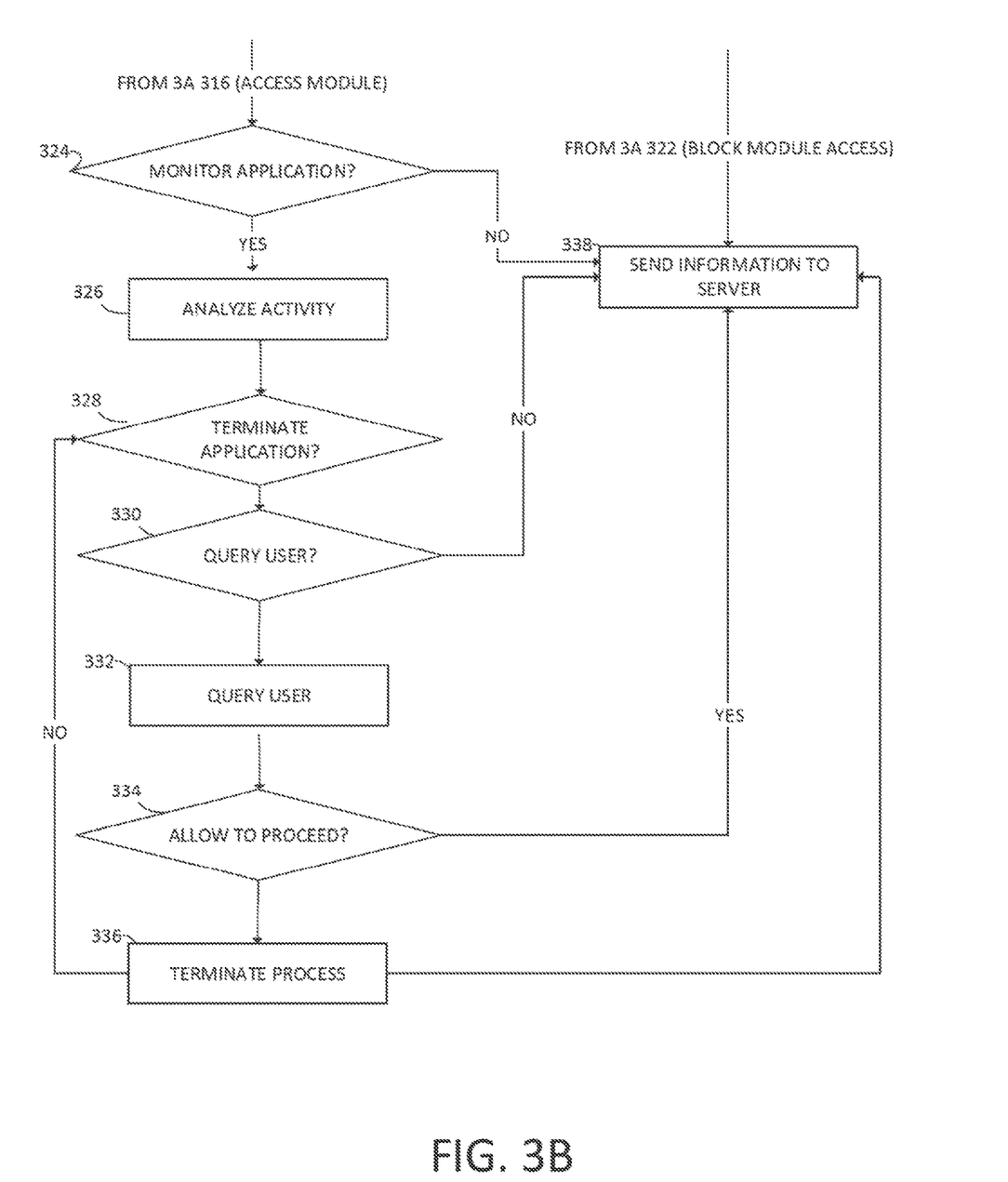

FIG. 3A and FIG. 3B provide an example method for determining an action based on a module sensitivity level and, optionally, a trust level. The method 300 begins on FIG. 3A and continues on 3B. Method 300 begins with scan module 302. This may be triggered by an application attempting to execute, load, or otherwise access a module. Scanning may include identifying one or more attributes of a module as described above. Identifying the attributes of the module 302 may comprise identifying one or more files associated with the module. For example the module may comprise or may be part of an executable file, object code, and dynamic link libraries (DLLs) used in 32-bit and 64-bit versions of one or more operating systems. As such, scanning the module may involve parsing one or more files associated with the module to determine the attributes of one or more files associated with the module. For example, the header data of a file may be analyzed to determine the schema and/or file type of a file associated with a module being analyzed by a software evaluation engine. Parsing may further extract static data from one or more files during the parsing process. The static data may include data such as header information, section information, import and export information, certificate information, resource information, string and flag information, legal information, comments, and program information, among other examples.

Method 300 then proceeds to obtain flag operation 304. In operation 304, sensitivity flags and/or trust flags are obtained. As described above, module attributes may be categorized into sensitivity levels, which may be established based on sensitivity flags as described above. Similarly, trust may be categorized based on privileges, digital signatures, or any of a variety of other environment attributes, which categorization may be described using trust flags. These flags may be obtained at a central library (which may be stored in a remote location), and a copy of the sensitivity flags and trust flags may be stored at a local system. Obtaining flags may be triggered by time (e.g., updates of the local system may occur at a specified time such as every 12 hours, every 24 hours, every 30 days, etc.). Additionally/alternatively, the flags may be updated upon the activity of the local system, such as an attempt to install, load, run, execute a module which has not been installed on the system and/or installed, loaded, ran, executed or otherwise accessed by a particular user, among other examples.

Method 300 then proceeds to assign sensitivity level operation 306. In operation 306, a sensitivity level of the module scanned at operation 302 is assigned. A client device, for example, may assign a sensitivity level to the module using a software evaluation engine as described above. Further assigning a sensitivity level to a module may occur using the sensitivity flags obtained in operation 304. For example, the attributes of the module identified during the scan at operation may be compared to the sensitivity flags obtained at operation 306. A comparison may reveal that the module has attributes that should be categorized as low, medium, or high sensitivity level. In aspects of the technology, the module will be assigned a sensitivity level associated with the highest ranking of the attribute.

Method 300 then optionally proceeds to analyze environment operation 308. In operation 308, a user profile and/or application accessing the module is analyzed to determine environment attributes. Environment attributes relate to, in aspects of the technology, the user's ability to perform certain tasks or access certain programs (e.g., privileges). This may include the right to install programs, the right to execute programs, the right to execute programs that perform certain functions, etc. These privileges may be tied to the user account or profile. For example, a user may login into a client device, which will set the privilege level based on the user login. In other examples, environment attributes may relate to a given application or set of applications, including, but not limited to, whether an application has a digital signature, a certificate authority associated with the application, etc.

Method 300 then optionally proceeds to assign trust level operation 310. In operation 310, a trust level is generated using the trust flags obtained in operation 304. Assigning of the trust level may be performed using a trust evaluation engine as described above. This may include comparing the environment attributes identified in operation 308 and the trust flags obtained in operation 304 to generate the trust level. A comparison may reveal that the environment has attributes that should be categorized as a low, medium, or high trust level. In aspects of the technology, the trust level will be determined based on a trust level associated with the highest ranking environmental attribute. Operations 308 and 310 are illustrated using dashed boxes to indicate that, in some examples, they may be omitted. For instance, a trust level may be generated prior to performing aspects of method 300.

Method 300 then proceeds to prevent access determination 312. In operation 312, it is determined whether to prevent the application from accessing the module. This may be based on the sensitivity level of the module and/or the generated trust level. In aspects of the technology, a remediation determination engine as described with reference to FIG. 1 determines whether to prevent access to the module. In some instances, the determination may be based on varying levels associated with a sensitivity level and/or trust level, such that, in some instances, preventing access to the module may be performed automatically.

Where a determination is made to not prevent access, method 300 proceeds to query user determination 314. In aspects of the technology, a decision as to whether to query the user to allow the module access is made. This may be based on the sensitivity level of the module and/or the trust level. In aspects of the technology, a remediation determination engine as described with reference to FIG. 1 determines whether to query the user regarding whether to allow the module access.

Where a determination is made to not query the user, method 300 then proceeds to access module 316 where the application is permitted to access the module (e.g., to load the module, execute the module, etc.).

Returning to determination 314, where it is determined to query the user regarding the module access, method 300 then proceeds to query user operation 318. At query user operation 318, a query to a user may be generated. For example, a visual, interactive graphic, audio, or other query may be generated to determine whether the user would like to permit the application to access the module. A system, such as a client device, may receive an indication as to whether the user would like to proceed with the module access.

The indication is analyzed at determination 320. If the user indicates that they would like to allow the module access to proceed, the method proceeds to access module operation 316. Where the user has indicated that they do not wish to proceed with the load, the method then proceeds to block access operation 322. At operation 322, access to the module is blocked.

Turning toward FIG. 3B, FIG. 3B indicates a continuation from of operation 316 (access module operation) and operation 322 (block module access) operation. From operation 316, method 300 proceeds to monitor application determination operation 324. In monitor application determination operation 324, it is determined whether to monitor the application that accessed the module. In aspects of the technology, a remediation determination engine as described with reference to FIG. 1 determines whether to monitor the application.

Where it is determined to monitor the application, operation then proceeds to analyze activity operation 326. In operation 326, the activity of the application is examined. One way in which the activity of the application may be examined is using a hooking technique, such that an indication of various function calls of the application is provided (e.g., to a remediation determination engine and/or a software evaluation engine). For example, during application load, a hooking technique may be employed to monitor the loaded application and/or accessed module. This may result in the function calls/activity of the monitored application to be identified.

Method 300 then proceeds to terminate process determination 328. In operation 328, it is determined whether to terminate the application based on the identified activity. This may be based on the sensitivity level of the module and/or the trust level. In aspects of the technology, a remediation determination engine as described with reference to FIG. 1 determines whether to terminate the application.

Where a determination is made to not terminate the module, method 300 proceeds to query user determination 330. In aspects of the technology, a decision as to whether to query the user to allow the application to proceed is made. This may be based on the sensitivity level of the module and/or the trust level. In aspects of the technology, a remediation determination engine as described with reference to FIG. 1 determines whether to query the user regarding whether to allow the application to continue to execute.

Where a determination is made to not query the user, method 300 then proceeds to send information to server operation 338. In send information to server operation 338, information related to answers to user queries (if any), module and/or environment attributes, a generated trust level, application/module activity, etc. is sent to a central server where the information may be further analyzed. This may be used to update information related to a security service, such as security service 114 described above with reference to FIG. 1. For example, the information may be used to change or alter trust flags and/or sensitivity flags stored at one or more servers.

Returning to determination 330, where it is determined to query the user to allow the application to continue to execute, method 300 then proceeds to query user operation 332. At query user operation 332, a query to a user may be generated. For example, a visual, interactive graphic, audio, or other query may be generated to determine whether the user would like to proceed with executing the application. A system, such as a client device, may receive an indication as to whether the user would like to proceed with application execution.

The indication is analyzed at determination 334. If the user indicates that they would like to allow the application to proceed, the method proceeds to send information to server operation 338 and the application is permitted to continue execution. Where the user has indicated that they do not wish to proceed with the execution of the application, the method then proceeds to terminate process operation 336. At operation 336, the application is terminated. After the application is terminated, operation 338 then proceeds to send information to server operation 338. It will be appreciated that while an example set of operations is discussed with respect to FIGS. 3A-3B, any of a variety of other operations may be performed, certain operations may be omitted, and/or operations may be performed in a different sequence.

Figure 4:
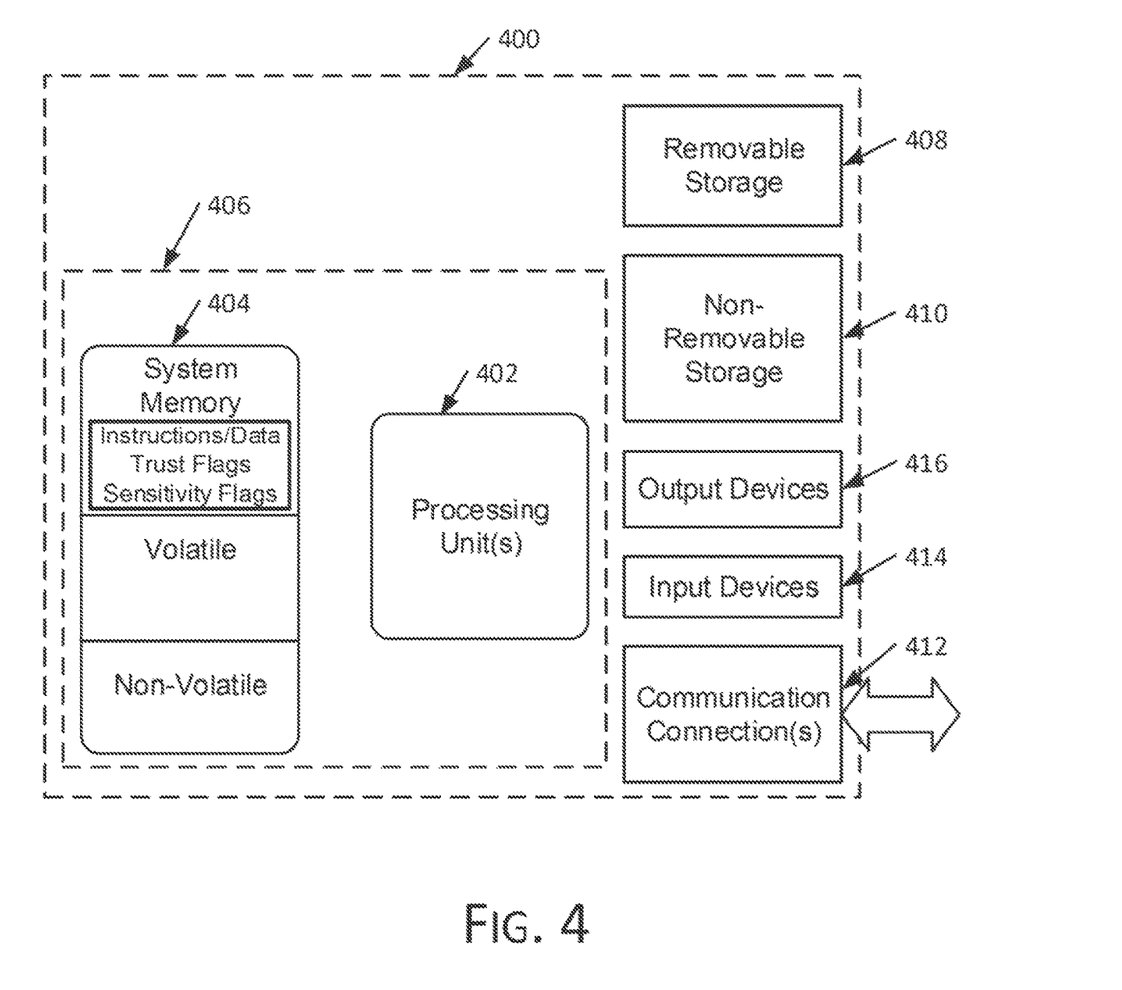
FIG. 4 illustrates one example of a suitable operating environment 400 in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, notification data, anti-exploit code/data, trust flags, sensitivity flags, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote compute may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a computer-implemented method for evaluating an application accessing a module. The method comprises: determining, based on one or more module attributes, a sensitivity level for the module; determining a trust level associated with the application; when the application accesses the module, evaluating the sensitivity level for the module and the trust level associated with the application to determine whether the application is suspicious; based on determining the application is suspicious, performing an action selected from the group of actions consisting of: preventing the application from accessing the module; monitoring the application; and querying the user as to whether to permit the application to access the module. In an example, the method further comprises: response to querying the user, receiving an indication to permit the application to access the module; and permitting the application to access the module. In another example, the method further comprises: sending, to a server, information relating to the determination whether the application is suspicious. In a further example, determining the sensitivity level for the module comprises: generating the one or more module attributes based on an evaluation of the module; accessing at least one sensitivity flag; and evaluating the one or more attributes based on the at least one sensitivity flag to determine the sensitivity level for the module. In yet another example, determining the trust level associated with the application comprises: generating one or more environment attributes associated with at least one of the application or a user; accessing at least one trust flag; and evaluating the one or more environment attributes based on the at least one trust flag to determine the trust level associated with the application. In a further still example, determining whether the application is suspicious comprises determining a degree to which the application is suspicious, and wherein the performed action is selected based on the determined degree. In another example, least one of determining the sensitivity level of the module or determining the trust level associated with the application occurs prior to executing the application.

In another aspect, the technology relates to a system comprising a processor in electronic communication with a computer storage device, the computer storage device storing instructions that, when executed, perform a method. The method comprises: accessing, from a security service, a sensitivity flag; generating at least one module attribute by scanning one or more files associated with a module; determining, based on the sensitivity flag and the at least one module attribute, a sensitivity level for the module; when an application accesses the module, evaluating the sensitivity level for the module to determine whether the application is suspicious; based on determining the application is suspicious, performing an action selected from the group of actions consisting of: preventing the application from accessing the module; monitoring the application; and querying the user as to whether to permit the application to access the module. In an example, the method further comprises: in response to querying the user, receiving an indication to permit the application to access the module; and permitting the application to access the module. In another example, the method further comprises: sending, to the security service, information regarding the at least one module attribute and the determination whether the application is suspicious. In a further example, accessing the module comprises at least one of: loading the module; or executing the module. In yet another example, determining whether the application is suspicious further comprises evaluating a trust level associated with the application. In a further still example, evaluating the trust level comprises: generating one or more environment attributes associated with at least one of the application or a user; accessing at least one trust flag; and evaluating the one or more environment attributes based on the at least one trust flag to determine the trust level associated with the application. In another example, determining whether the application is suspicious comprises determining a degree to which the application is suspicious, and wherein the performed action is selected based on the determined degree.

In a further aspect, the technology relates to a computer storage device storing instructions that, when executed, are capable of performing a method. The method comprises: determining, based on one or more module attributes, a sensitivity level for the module; determining a trust level associated with the application; when the application accesses the module, evaluating the sensitivity level for the module and the trust level associated with the application to determine whether the application is suspicious; based on determining the application is suspicious, performing an action selected from the group of actions consisting of: preventing the application from accessing the module; monitoring the application; and querying the user as to whether to permit the application to access the module. In an example, the method further comprises: in response to querying the user, receiving an indication to permit the application to access the module; and permitting the application to access the module. In another example, the method further comprises: sending, to a server, information relating to the determination whether the application is suspicious. In a further example, determining the sensitivity level for the module comprises: generating the one or more module attributes based on an evaluation of the module; accessing at least one sensitivity flag; and evaluating the one or more attributes based on the at least one sensitivity flag to determine the sensitivity level for the module. In yet another example, determining the trust level associated with the application comprises: generating one or more environment attributes associated with at least one of the application or a user; accessing at least one trust flag; and evaluating the one or more environment attributes based on the at least one trust flag to determine the trust level associated with the application. In a further still example, determining whether the application is suspicious comprises determining a degree to which the application is suspicious, and wherein the performed action is selected based on the determined degree.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broadest scope of the claimed disclosure.

What is claimed is:

1. A computer-implemented method for managing loading of sensitive modules, comprising:
   based on an application attempting to access a module, scanning the module to obtain module attributes;
   generating a sensitivity level of the module based on the module attributes;
   analyzing a computing environment of the application to generate a trust level associated with the application;
   determining whether to prevent access to the module by the application based on the sensitivity level and the trust level;
   when the determination is to prevent access, blocking access to the module, otherwise when the determination is to not prevent access:
      determining whether to monitor the application attempting to access the module;
      when the determination is to monitor the application:
         analyzing activity of the application;
         determining whether to terminate the application based on the analyzed activity of the application, wherein the analyzed activity of the application indicates suspicious activity;
         when the determination is to terminate the application, terminating the application, otherwise permitting the application to continue execution.

2. The computer-implemented method of claim 1, wherein, when determining whether to prevent access to the module by the application is to not prevent access, sending security information to a security server.

3. The computer-implemented method of claim 1, wherein scanning the module comprises identifying one or more files associated with the module, the one or more files comprising an executable file, an object code file, or dynamic link libraries.

4. The computer-implemented method of claim 1, wherein generating a sensitivity level of the module based on the module attributes comprises categorizing the module attributes into one of a group of predefined sensitivity levels.

5. The computer-implemented method of claim 1, wherein the sensitivity level comprises a range of sensitivity level values from a low sensitivity level to a high sensitivity level and the trust level comprises a range of trust level values from a low trust level to a high trust level and determining whether to prevent access by the application to the module based on the sensitivity level and the trust level comprises:
cross-correlating a sensitivity level value of the range of the sensitivity level values to a trust level value of the range of the trust level values to arrive at a combined sensitivity and trust level combination and basing whether to prevent access to the module by the application on the sensitivity and the trust level combination.

6. The computer-implemented method of claim 1, wherein analyzing activity of the application comprises analyzing a plurality of application function calls.

7. The computer-implemented method of claim 2, wherein sending security information to the security server comprises sending environmental attributes, security attributes, security levels, trust attributes, application activity, or module activity to the security server, the security server determining whether to update the security information.

8. A system for managing loading of sensitive modules, comprising:
a processor;
a computer storage device in electronic communication with the processor, the computer storage device storing instructions that, when executed by the processor, perform a method of:
based on an application attempting to access a module, scanning the module to obtain module attributes;
generating a sensitivity level of the module based on the module attributes;
analyzing a computing environment of the application to generate a trust level associated with the application;
determining whether to prevent access to the module by the application based on the sensitivity level and the trust level;
when the determination is to prevent access, blocking access to the module, otherwise when the determination is to not prevent access:
determining whether to monitor the application attempting to access the module;
when the determination is to monitor the application:
analyzing activity of the application;
determining whether to terminate the application based on the analyzed activity of the application, wherein the analyzed activity of the application indicates suspicious activity;
when the determination is to terminate the application, terminating the application, otherwise permitting the application to continue execution.

9. The system of claim 8, wherein, when determining whether to prevent access to the module by the application is to not prevent access, sending security information to a security server.

10. The system of claim 8, wherein scanning the module comprises identifying one or more files associated with the module, the one or more files comprising an executable file, an object code file, or dynamic link libraries.

11. The system of claim 8, wherein generating a sensitivity level of the module based on the module attributes comprises categorizing the module attributes into one of a group of predefined sensitivity levels.

12. The system of claim 8, wherein the sensitivity level comprises a range of sensitivity level values from a low sensitivity level to a high sensitivity level and the trust level comprises a range of trust level values from a low trust level to a high trust level and determining whether to prevent access by the application to the module based on the sensitivity level and the trust level comprises:
cross-correlating a sensitivity level value of the range of sensitivity level values to a trust level value of the range of trust level values to arrive at a combined sensitivity and trust level combination and basing whether to prevent access to the module by the application on the sensitivity and the trust level combination.

13. The system of claim 8, wherein analyzing activity of the application comprises analyzing a plurality of application function calls.

14. The system of claim 9, wherein sending security information to the security server comprises sending environmental attributes, security attributes, security levels, trust attributes, application activity, or module activity to the security server, the security server determining whether to update the security information.

15. A computer storage device storing instructions that, when executed, are capable of performing a method for managing loading of sensitive modules, the method comprising:
based on an application attempting to access a module, scanning the module to obtain module attributes;
generating a sensitivity level of the module based on the module attributes;
analyzing a computing environment of the application to generate a trust level associated with the application;
determining whether to prevent access to the module by the application based on the sensitivity level and the trust level;
when the determination is to prevent access, blocking access to the module, otherwise when the determination is to not prevent access:
determining whether to monitor the application attempting to access the module;
when the determination is to monitor the application:
analyzing activity of the application;
determining whether to terminate the application based on the analyzed activity of the application, wherein the analyzed activity of the application indicates suspicious activity;
when the determination is to terminate the application, terminating the application, otherwise permitting the application to continue execution.

16. The computer storage device of claim 15, wherein, when determining whether to prevent access to the module by the application is to not prevent access, sending security information to a security server.

17. The computer storage device of claim 15, wherein scanning the module comprises identifying one or more files associated with the module, the one or more files comprising an executable file, an object code file, or dynamic link libraries.

18. The computer storage device of claim 15, wherein the sensitivity level comprises a range of sensitivity level values from a low sensitivity level to a high sensitivity level and the trust level comprises a range of trust level values from a low trust level to a high trust level and determining whether to prevent access by the application to the module based on the sensitivity level and the trust level comprises:

cross-correlating a sensitivity level value of the range of the sensitivity level value to a trust level value of the range of the trust level values to arrive at a combined sensitivity and trust level combination and basing whether to prevent access to the module by the application on the sensitivity and the trust level combination.

19. The computer storage device of claim 15, wherein analyzing activity of the application comprises analyzing a plurality of application function calls.

20. The computer storage device of claim 16, wherein sending security information to the security server comprises sending environmental attributes, security attributes, security levels, trust attributes, application activity, or module activity to the security server, the security server determining whether to update the security information.

\* \* \* \* \*